United States Patent [19]
Nakajima et al.

[11] Patent Number: 5,858,161
[45] Date of Patent: Jan. 12, 1999

[54] METHOD OF ASSEMBLING AN OPTICAL FIBER CONNECTOR AND AN ADHESIVE AGENT INJECTING JIG FOR USE THEREWITH

[75] Inventors: Masahiro Nakajima; Masahiko Kumaoh; Yuhkou Hata, all of Chiba, Japan

[73] Assignee: Seiko Instruments Inc., Japan

[21] Appl. No.: 657,518

[22] Filed: Jun. 3, 1996

[30] Foreign Application Priority Data

Jun. 2, 1995 [JP] Japan .................................. 7-136962

[51] Int. Cl.$^6$ ...................................................... G02B 6/36
[52] U.S. Cl. ............................................. 156/293; 385/80
[58] Field of Search .................................. 156/293, 294; 385/80, 53

[56] References Cited

U.S. PATENT DOCUMENTS

| | | |
|---|---|---|
| 5,181,267 | 1/1993 | Gerace et al. .......................... 385/80 X |
| 5,222,169 | 6/1993 | Chang et al. . |
| 5,285,510 | 2/1994 | Slaney . |
| 5,381,497 | 1/1995 | Toland et al. .............................. 385/80 |
| 5,436,994 | 7/1995 | Ott et al. ................................... 385/86 |
| 5,465,313 | 11/1995 | Belenkiy et al. .......................... 385/80 |

FOREIGN PATENT DOCUMENTS

| | | |
|---|---|---|
| 330399 | 8/1989 | European Pat. Off. . |
| 432947 | 6/1991 | European Pat. Off. . |
| 690320 | 1/1996 | European Pat. Off. . |

*Primary Examiner*—Jeff H. Aftergut
*Attorney, Agent, or Firm*—Adams & Wilks

[57] ABSTRACT

A method for assembling an optical fiber connector comprises providing a ferrule having a first end portion, a second end portion and a bore extending through the first and second end portions. A first open end of a tubular member is fitted over the first end portion of the ferrule without a gap therebetween. An adhesive agent is then injected into the bore of the ferrule through a second open end of the tubular member. The tubular member is thereafter removed from the second end portion of the ferrule, and an optical fiber is inserted into the bore of the ferrule to thereby fix the optical fiber in the bore of the ferrule.

17 Claims, 5 Drawing Sheets

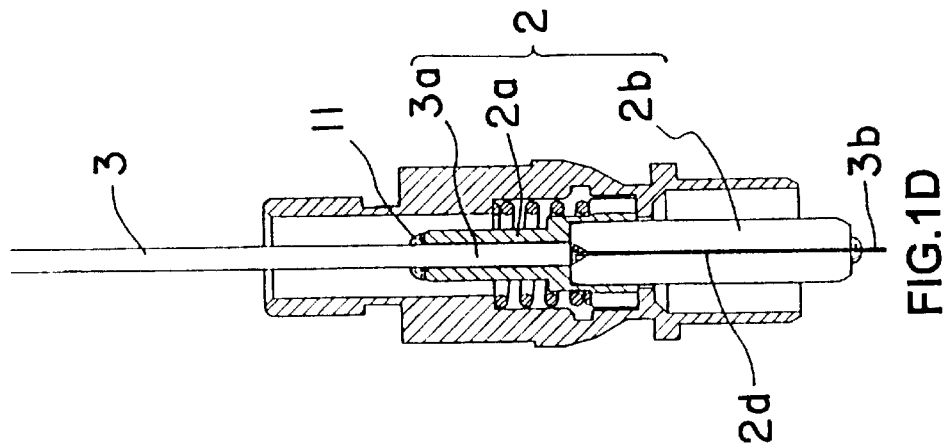
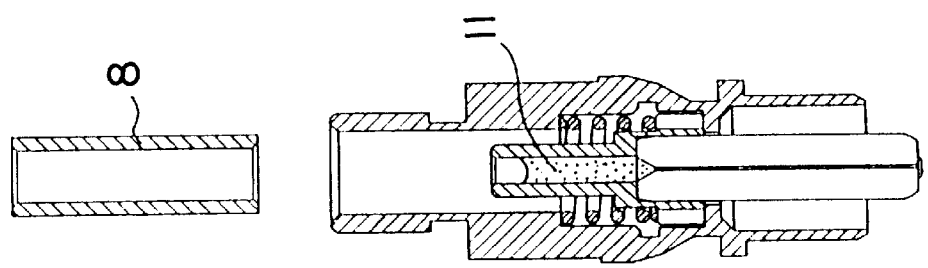
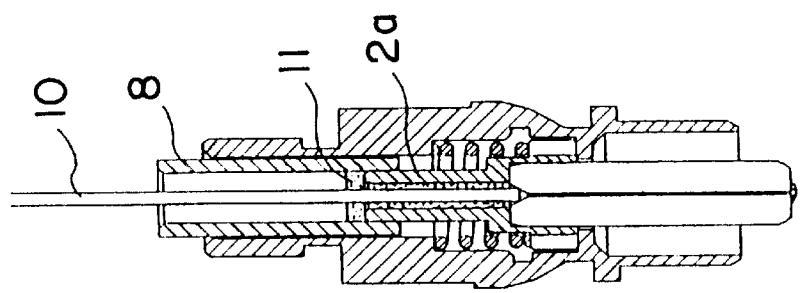
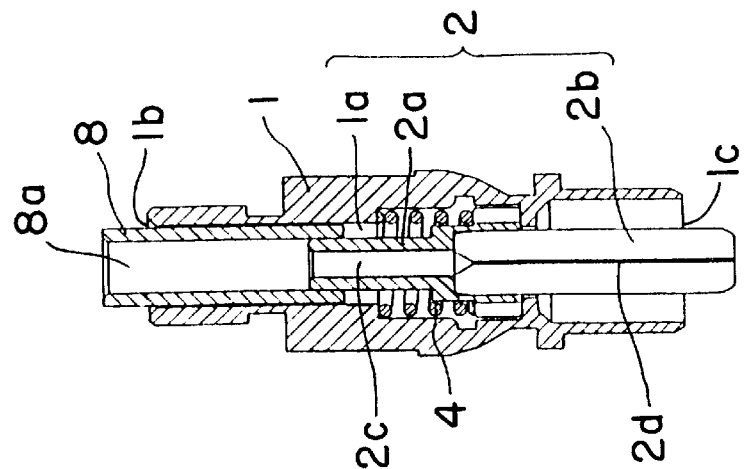

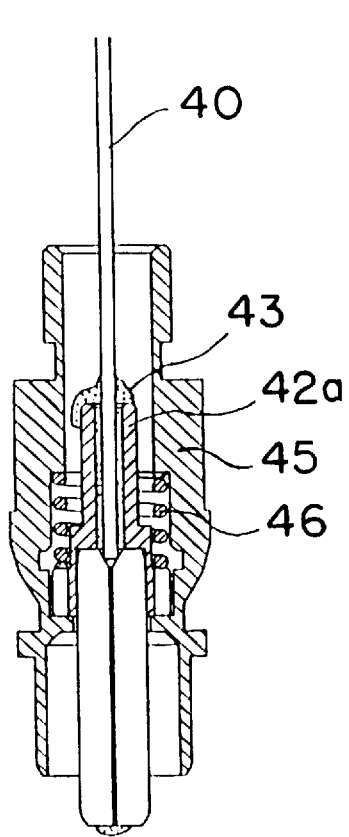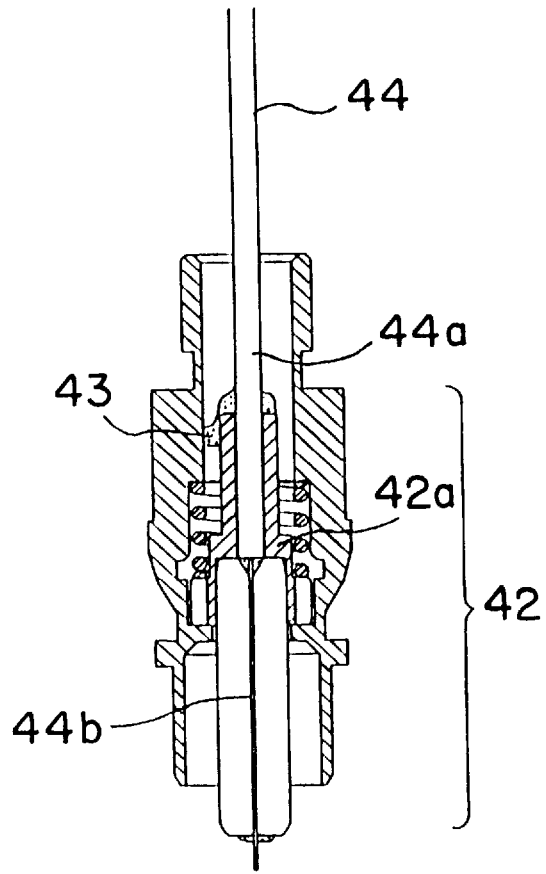
FIG. 2A
PRIOR ART
FIG. 2B
PRIOR ART

METHOD OF ASSEMBLING AN OPTICAL FIBER CONNECTOR AND AN ADHESIVE AGENT INJECTING JIG FOR USE THEREWITH

BACKGROUND OF THE INVENTION

The present invention relates to a method of assembling an optical fiber connector, and to an adhesive agent injecting jig for fixing an optical fiber to a ferrule to form an optical fiber connector.

Generally, as an optical fiber for transmission of optical signals, one or more optical fibers connected by connecting means such as connectors, welding and splices have been used. There are many cases in which optical fiber connectors and optical fiber cables having a high strength body for protecting a coated optical fiber from adverse influences to transmission of optical signals, such as a disturbance, and a coating sheath, such as PVC, are used. The optical fiber is usually made of brittle components such as glass, etc., and has a diameter which is as thin as 0.1 mm. Usually, nylon is sheathed around the optical fiber, which forms a coated optical fiber having a diameter of about 1 mm.

At the time of assembling the optical fiber cables and the optical fiber connectors, if the optical fiber connectors and the coated fiber of the optical fiber cable receive a local bending load due to compression forces, the optical signal transmitted therethrough is subjected to transmission loss, such as leakage of the optical signal to the outside, and to the disconnection of the optical transmission due to breakage of the coated optical fiber, etc.

Conventionally, when the optical fiber is fixed to a cylindrical ferrule having a penetrating hole at a center thereof, which constitutes an optical fiber connector, it is common to use an adhesive agent. FIGS. 2A and 2B are sectional views showing a conventional optical fiber connector assembling method in which an injection needle 40 is inserted directly into a cylindrical rear portion 42*a* of a ferrule 42. As shown in FIG. 2A, the injection needle 40 is inserted into a penetrating hole formed in the rear portion 42*a* of the ferrule 42, and an adhesive agent 43 is injected thereinto. Next, the injection needle 40 is removed and a coated or clad portion 44*a* of an optical fiber 44 having an exposed tip portion 44*b* whose coating or cladding has been removed is inserted through the rear portion 42*a* of the ferrule 42, so that the coated portion 44*a* and the exposed tip portion 44*b* of the optical fiber 44 are fixed to the ferrule 42 (FIG. 2B).

However, the foregoing conventional optical fiber connector assembling method suffers from the problem that the amount of the adhesive agent 43 must be controlled in order to prevent the overflow of the adhesive agent from the rear portion 42*a* of the ferrule 42 which is located at an innermost portion of a housing 45 of the optical fiber connector. Furthermore, since the rear portion 42*a* of the ferrule 42 is located at the innermost portion of the housing 45 of the optical fiber connector, it has been difficult to remove the overflowed adhesive agent 43. Yet another problem with the conventional optical fiber connector assembling method is that the ferrule 42 cannot be moved in the axial direction, since the adhesive agent 43 overflows to a location intermediate between the rear portion 42*a* of the ferrule 42 and the housing 45, and to a location on which a coil spring 46 is mounted, thereby firmly fixing the ferrule 42 to the inside of the housing 45.

SUMMARY OF THE INVENTION

It is an object of the present invention to provide an optical fiber connector having a ferrule to which an optical fiber is securely fixed with an adhesive agent and which effectively prevents the adhesive agent from overflowing to the periphery of the ferrule.

It is another object of the present invention to provide an adhesive agent injecting jig for injecting an adhesive agent into a ferrule in an optical fiber connector to permit an optical fiber to be fixed to the ferrule while effectively preventing the adhesive agent from overflowing to the periphery of the ferrule.

It is yet another object of the present invention to provide an optical fiber connector assembling method in which an adhesive agent is accurately and controllably injected into a rear portion of a ferrule for fixing the optical fiber to the optical fiber connector while effectively preventing the adhesive agent from overflowing to the periphery of the ferrule.

The foregoing and other objects of the present invention are carried out by an optical fiber connector comprising a housing having a bore and first and second open ends, a ferrule disposed in the bore of the housing and having a first end extending outwardly from the first end of the bore and a second end extending outwardly from the second end of the bore, and means for supporting the ferrule in the bore of the housing for axial movement therein.

In another aspect, the present invention comprises an adhesive agent injecting jig for injecting an adhesive agent into a ferrule of an optical fiber connector. In one embodiment, the adhesive agent injecting jig comprises a tubular member having a central bore of a diameter slightly greater or smaller than the diameter of an end of the ferrule to permit an end of the tubular member to be fitted around or into, respectively, the end of the ferrule without a gap therebetween.

In another embodiment, the adhesive agent injecting jig comprises a tubular member having a sleeve, a head portion extending from a first end of the sleeve, and a cylindrical bore extending through the head portion and the sleeve. The bore has a first diverging bore portion, a first cylindrical bore portion, a second diverging bore portion, and a second cylindrical bore portion. A longitudinally extending annular recess is formed in the sleeve at a second end of the sleeve to divide the sleeve into first and second sleeve portions. The annular recess has a diameter slightly greater or smaller than an end of the ferrule to permit the second end of the sleeve to be fitted around or into, respectively, the end of the ferrule without a gap therebetween.

In yet another embodiment, the adhesive agent injecting jig comprises a tubular member having a sleeve, a frusto-conical flange portion extending from a first end of the sleeve, and a bore extending through the flange portion and the sleeve. At least a second end of the sleeve has a diameter slightly greater or smaller than an end of the ferrule to permit the second end of the sleeve to be fitted around or into, respectively, the end of the ferrule without a gap therebetween.

In another aspect, the present invention is directed to an optical fiber connector assembling method which comprises providing a ferrule having a bore for receiving an optical fiber therein, fitting an end of a tubular member into or around an end of the ferrule without a gap therebetween, injecting an adhesive agent into the bore of the ferrule through the tubular member, removing the tubular member, and inserting a coated optical fiber which is exposed at an end portion thereof into the bore of the ferrule containing the adhesive agent to fix the optical fiber in the ferrule.

BRIEF DESCRIPTION OF THE DRAWINGS

The foregoing summary, as well as the following detailed description, will be better understood when read in conjunction with the appended drawings. For the purpose of illustrating the invention, there are shown embodiments which are presently preferred, it being understood, however, that this invention is not limited to the precise arrangements and instrumentalities shown. In the drawings:

FIGS. 1A–1D are sectional views of an optical fiber connector assembling method according to an embodiment of the present invention;

FIGS. 2A–2B are sectional views of a conventional optical fiber connector assembling method;

DETAILED DESCRIPTION OF THE PREFERRED EMBODIMENTS

Figure 3A:
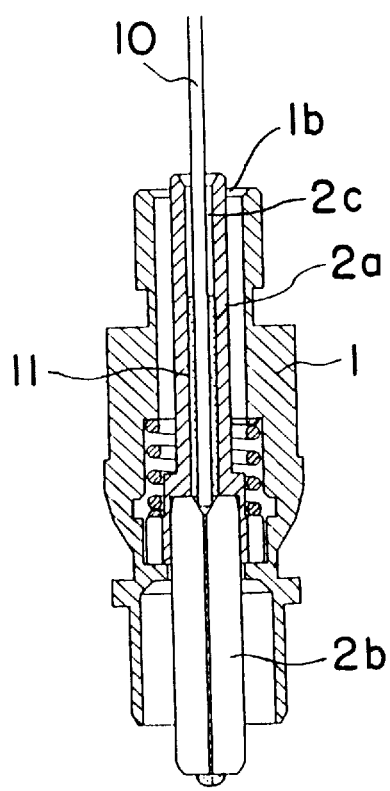
FIGS. 3A–3B are sectional views of an optical fiber connector assembling method according to another embodiment of the present invention.

FIGS. 1A–1B show sectional views of an optical fiber connector assembling method according to one embodiment of the present invention. The optical fiber connector comprises a housing 1 having a bore 1a, a first open end 1b and a second open end 1c. A ferrule 2 extends into the bore 1a of the housing 1 and has a first end portion 2a disposed completely within the bore 1a, and a second end portion 2b extending outwardly from the second end 1c of the housing 1. The ferrule 2 has a longitudinal bore having a first bore portion 2c and a second bore portion 2d. The first bore portion 2c of the ferrule 2 is dimensioned to receive an insulated or coated portion 3a of an optical fiber 3, and the second bore portion 2d has a diameter smaller than the first bore portion 2c and is dimensioned to receive an exposed, uncoated end 3b of the optical fiber 3. A biasing member, such as a coil spring 4, supports the ferrule 2 in the bore 1a of the housing 1 for axial displacement therein.

According to the method of the present embodiment, one end of an adhesive agent injecting jig 8 comprising a tubular member or hollow sleeve having a central bore 8a is first fitted around an end of the first end portion 2a of the ferrule 2 (FIG. 1A), while another end of the injecting jig projects outwardly from the first open end 1b of the housing 1. The bore 8a of the hollow sleeve 8 has a diameter slightly greater than the outer diameter of the first end portion 2a of the ferrule 2 such that no gap exists therebetween. For example, the first end portion 2a of the ferrule 2 is removably fitted inside the bore 8a of the hollow sleeve 8 with a friction fit sufficient to provide a secure connection while permitting the hollow sleeve 8 to be removed from the ferrule 2 without deformation of the ferrule.

Next, an injecting needle 10 of an adhesive agent injecting device is inserted into the first bore portion 2c of the ferrule 2, and an adhesive agent 11 is injected into the first bore portion 2c (FIG. 1B). Thereafter, the hollow sleeve 8 is removed (FIG. 1C), and the optical fiber 3 is inserted through the bore of the ferrule 2 and is fixed therein by the adhesive agent 11 (FIG. 1D). In particular, the adhesive agent 11 fixes the insulated portion 3a of the optical fiber 3 in the first bore portion 2c of the ferrule 2 and fixes the exposed tip portion 3b in the second bore portion 2d to complete the optical fiber connector assembling method.

By the foregoing optical fiber connector assembling method, since one end of the hollow sleeve 8 is fitted around the end of the ferrule 2 without a gap therebetween, and another end of the hollow sleeve 8 projects outwardly from the housing 1, the flow of the adhesive agent 11 during injection thereof into the bore of the ferrule 2 is effectively controlled so that it does not overflow into the bore 1a of the housing 1.

Figure 3B:
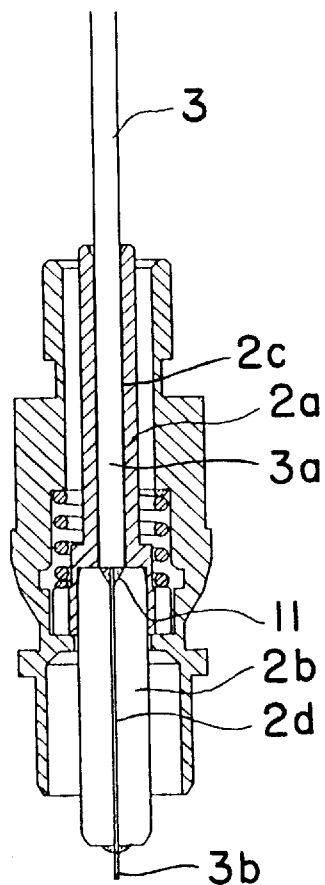

FIGS. 3A–3B show sectional views of another embodiment of the optical fiber connector assembling method according to the present invention. The optical fiber connector in this embodiment comprises the elements described above with respect to the embodiment of FIGS. 1A–1D. However, in the present embodiment an end of a tubular member 8 is not fitted over or into the first end portion 2a of the ferrule 2. Instead, the first end portion 2a of the ferrule 2 projects outwardly from the first open end 1b of the housing 1, and the injecting needle 10 is inserted directly into the first bore portion 2c of the ferrule 2 and the adhesive agent 11 is injected into the first bore portion 2c (FIG. 3A). Thereafter, the optical fiber 3 is inserted through the bore of the ferrule 2 and is fixed therein by the adhesive agent 11 (FIG. 3B).

By the foregoing optical fiber connector assembling method, since the first end portion 2a of the ferrule 2 projects outwardly from the first open end 1b of the housing 1, and the adhesive agent injecting needle 10 is inserted directly into the first end portion 2a, the flow of the adhesive agent 11 is effectively controlled so that it does not overflow into the bore 1a of the housing 1.

FIGS. 4A–4D show sectional views of another embodiment of the optical fiber connector assembling method according to the present invention. The optical fiber connector in this embodiment comprises all of the elements described above with respect to the embodiment of FIGS. 1A–1D. However, the assembling method of the present embodiment employs an adhesive agent injecting jig 15 which differs from the adhesive agent injecting jig 8 employed in the assembling method of the embodiment of FIGS. 1A–1D.

Figure 5:
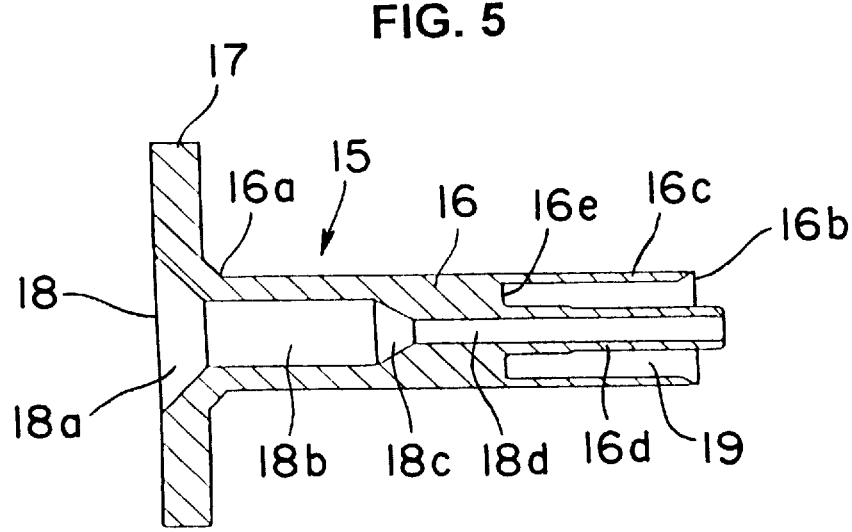
FIG. 5 is a sectional view of an adhesive agent injecting jig according to an embodiment of the present invention.

Referring to FIG. 5, the adhesive agent injecting jig 15 according to this embodiment comprises a tubular member having a sleeve 16, a flange or head portion 17 extending from a first end 16a of the sleeve 16, and a longitudinal bore 18 extending through the head portion 17 and the sleeve 16. The bore 18 has a first diverging bore portion 18a extending through the head portion 17 a cylindrical bore portion 18b, a second diverging bore portion 18c, and a second cylindrical bore portion 18d which define a flow path of decreasing diameter from the head portion 17 to a second end 16b of the sleeve 16. A longitudinally extending annular recess 19 is formed in the sleeve 16 around the second cylindrical bore portion 18d to divide the sleeve into first and second concentric tubular or sleeve portions 16c, 16d. One end of the annular recess 19 terminates at a stopper portion 16e of the sleeve 16 disposed between the first and second ends 16a, 16b thereof for limiting the extent that the sleeve 16 is fitted over the first end portion of the ferrule, as further described below. Preferably, the second sleeve portion 16d projects outwardly from the second end 16b of the sleeve 16 and has an outer diameter slightly smaller than the diameter of the first bore portion 2c of the ferrule 2 to permit the sleeve portion 16d to be removably fitted into the first bore portion 2c with a friction fit. Also the longitudinally extending annular recess 19 preferably has a diameter slightly greater than the outer diameter of the first end portion 2a of the ferrule 2 to permit the second end 16b of the sleeve to be removably fitted around the first end portion 2a without a gap therebetween.

By this construction, the adhesive agent injecting jig 15 can be removably supported around the end portion 2a of the ferrule 2 in a stable manner to prevent any leakage of the adhesive agent 11 into the bore 1a of the housing 1 during injection of the adhesive agent 11 into the first bore portion 2c of the ferrule 2. Furthermore, the progressively decreasing diameter flow path defined by the bore portions 18a–18d of the adhesive agent injecting jig 15 provides a means for controlling the flow of the adhesive agent 11 injected into the first bore portion 2c of the ferrule 2.

Figure 4A:
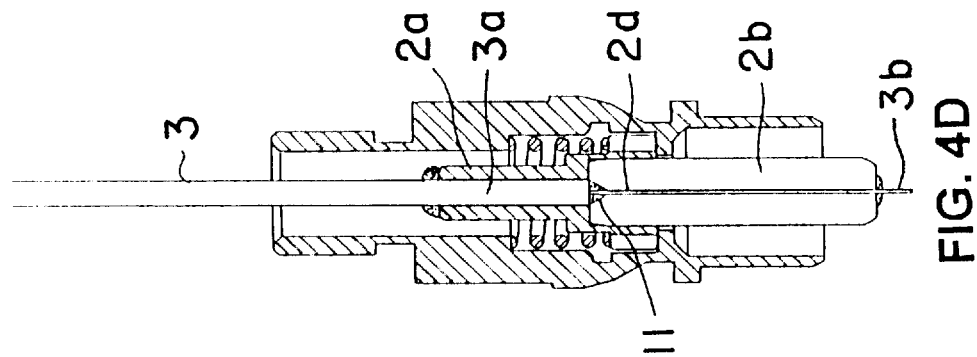
FIGS. 4A–4D are sectional view of an optical fiber connector assembling method according to another embodiment of the present invention.
Figure 4B:
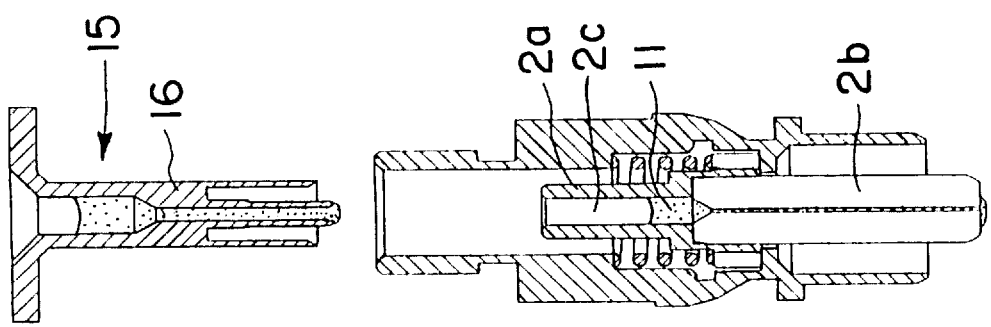
Figure 4C:
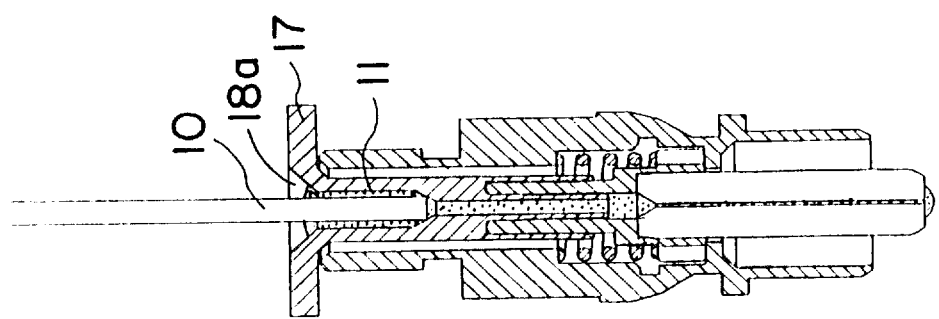
Figure 4D:
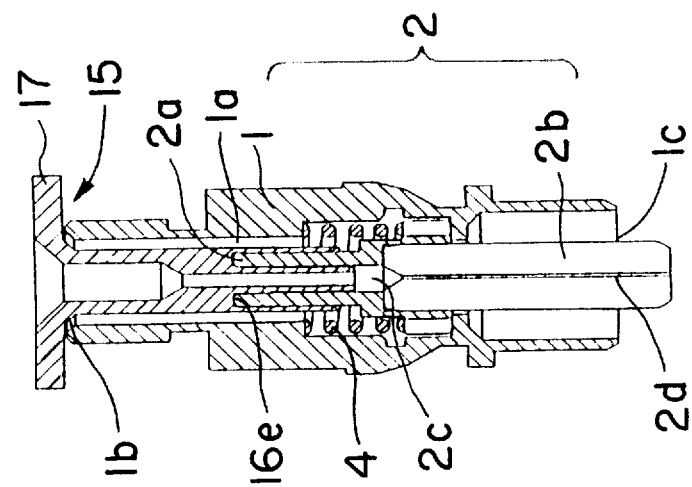

The optical fiber connector assembling method according to the present embodiment is described with reference to FIGS. 4A–4D and 5. The adhesive agent injecting jig 15 is first removably connected to the first end portion 2a of the ferrule 2 (FIG. 4A) by manipulation of the head portion 17. More particularly, the first sleeve portion 16c of the sleeve 16 is friction fitted over the first end portion 2a of the ferrule 2 such that the second sleeve portion 16d projects into the first bore portion 2c of the ferrule 2 with a friction fit. In this embodiment, the extent which the first sleeve portion 16c is fitted over the first end portion 2a of the ferrule 2 is limited by the stopper portion 16e of the sleeve 16 which contacts with the first end portion 2a of the ferrule 2. In this state, as shown in FIG. 4A, the head portion 17 projects outwardly from the first open end 1b of the housing 1. The adhesive agent injecting needle 10 is then inserted through the first diverging bore portion 18a of the adhesive agent injecting jig 15, and the adhesive agent 11 is injected into the first bore portion 2c of the ferrule 2 up to the first diverging bore portion 18a (FIG. 4B). Next, the adhesive agent injecting jig 15 is removed from the first end portion 2a of the ferrule 2 (FIG. 4C). Thereafter, the optical fiber 3 is inserted through the bore of the ferrule 2 and is fixed therein by the adhesive agent 11 (FIG. 4D). In particular, the insulated portion 3a of the optical fiber 3 is fixed in the first bore portion 2c of the ferrule, and the exposed tip portion 3b of the optical fiber 3 is fixed in the second bore portion 2d of the ferrule 2.

By the foregoing optical fiber connector assembling method, since the adhesive agent injecting jig 15 can be securely fitted over the first end portion 2a of the ferrule 2 without a gap therebetween, and since the adhesive agent injecting jig 15 has a progressively decreasing diameter flow path defined by the bore portions 18a–18d from the head portion 17 to the second end 16b of the sleeve 16, the flow of the adhesive agent 11 which is injected into the first bore portion 2c of the ferrule 2 is effectively controlled so that it does not overflow into the bore 1a of the housing 1.

Figure 6:
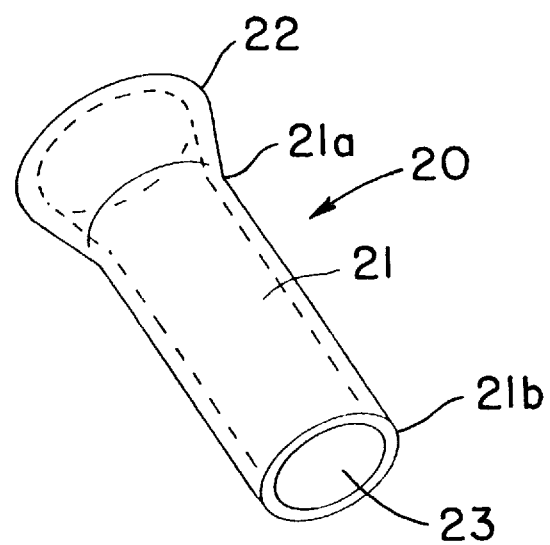
FIG. 6 is a perspective view of an adhesive agent injecting jig according to another embodiment of the present invention.

FIG. 6 is a perspective view of another embodiment of adhesive agent injecting jig 20 used in the optical fiber connector assembling method according to the present invention. In this embodiment, the adhesive agent injecting jig 20 comprises a tubular member having a sleeve 21, a frustoconical flange portion 22 extending from a first end 21a of the sleeve 21, and a longitudinal bore 23 extending through the head portion 22 and the sleeve 21. The diameter of the bore 23 in the sleeve 21 is slightly greater than the diameter of first end portion 2a of the ferrule 2 so that the second end 21b of the sleeve 21 is fitted around the first end portion 2a of the ferrule 2 without a gap therebetween.

During assembly of the optical fiber connector according to this embodiment, the adhesive agent injecting jig 20 is employed in the same manner described above for the adhesive agent injecting jig 8 in the embodiment of FIGS. 1A–1D. In this embodiment, however, the frustoconical flange portion 21 of the adhesive agent injecting jig 20 extends outwardly from the first end 1b of the housing 1 when the second end 21b of the ferrule 21 is fitted over the second end portion 2a of the ferrule 2. By this method, since the frustoconical flange portion 21 extends outwardly from the first end 1b of the housing 1, the flow of the adhesive agent 11 which is injected into the first bore portion 2c of the ferrule 2 is effectively controlled so that it does not overflow into the bore 1a of the housing 1.

In the optical fiber connector assembling methods described above with respect to the embodiments of FIGS. 1A–1D, 4A–4D and 6, a tubular end of the adhesive agent injecting jig is fitted over the first end portion 2a of the ferrule 2 without a gap therebetween. However, it is understood by those of ordinary skill in the art that the method according to the present invention could also be effectively accomplished by dimensioning the outer diameter of the hollow sleeve 8 (FIGS. 1A–1D), the outer diameter of the sleeve 16 (FIGS. 4A–4D) and the outer diameter of the sleeve 21 (FIG. 6) to a size slightly smaller than the diameter of the first bore portion 2c of the ferrule 2, and by removably fitting the end of the corresponding sleeve into the first bore portion 2c without a gap therebetween.

It will be appreciated by those skilled in the art that by the optical fiber connector assembling method according to the present invention, the injection of the adhesive agent into the bore of the ferrule is facilitated and can be effectively accomplished without leakage of the adhesive agent into the bore of the housing supporting the ferrule due to the stable connection between the adhesive agent injecting jig and the ferrule. Moreover, injection of the adhesive agent into the bore of the ferrule can also be effectively accomplished without overflow into the bore of the housing.

What is claimed is:

1. An optical fiber connector assembling method comprising the steps: providing a housing having a first open end, a second open end and a bore extending through the housing and terminating at the first and second open ends; providing a ferrule having a first end portion, a second end portion and a bore extending through the first and second end portions; providing a tubular member having a first open end, a second open end and a flange portion disposed at the second open end of the tubular member; disposing the ferrule within the bore of the housing so that the first end portion of the ferrule is directed toward the first open end of the housing but does not extend as far as the first open end of the housing; fitting the first open end of the tubular member into the first open end of the housing and over the first end portion of the ferrule while projecting the flange portion of the tubular member outwardly from the first open end of the housing; injecting an adhesive agent into the bore of the ferrule through the second open end and the flange portion of the tubular member; removing the tubular member from the first end portion of the ferrule; and inserting an optical fiber into the bore of the ferrule to thereby fix the optical fiber in the bore of the ferrule.

2. An optical fiber connector assembling method according to claim 1; wherein the ferrule has a first bore portion and a second bore portion having a diameter smaller than the first bore portion; and wherein the inserting step comprises inserting an insulated portion of the optical fiber into the first bore portion of the ferrule so that an exposed portion of the optical fiber projects into the second bore portion of the ferrule and a tip of the exposed portion projects out of the second open end of the housing.

3. An optical fiber connector assembling method according to claim 1; wherein the tubular member has a longitudinal bore extending through the first and second open ends of the tubular member, the longitudinal bore having a decreasing cross-sectional area from the second open end of the tubular member towards the first open end of the tubular member.

4. An optical fiber connector assembling method according to claim 1; wherein the fitting step includes attaching the tubular member at least to a radially inward facing surface of the first end portion of the ferrule.

5. An optical fiber connector assembling method according to claim 1; wherein the fitting step includes fitting the first open end of the tubular member over the first end portion of the ferrule without a gap therebetween.

6. An optical fiber connector assembling method comprising the steps: providing a housing having a first open end, a second open end and a bore extending through the housing and terminating at the first and second open ends; providing a ferrule having a first end portion, a second end portion and a bore extending through the first and second end portions; providing a tubular member having a first open end and a second open end, the first open end of the tubular member having an annular recess defining first and second concentric sleeve portions; disposing the ferrule within the bore of the housing so that the first end portion of the ferrule is directed toward the first open end of the housing but does not extend as far as the first open end of the housing; fitting the first open end of the tubular member into the first open end of the housing and over the first end portion of the ferrule while inserting the first end portion of the ferrule between the concentric sleeve portions of the tubular member; injecting an adhesive agent into the bore of the ferrule through the second open end of the tubular member; removing the tubular member from the first end portion of the ferrule; and inserting an optical fiber into the bore of the ferrule to thereby fix the optical fiber in the bore of the ferrule.

7. An optical fiber connector assembling method comprising the steps: providing a housing having a first open end, a second open end and a bore extending through the housing and terminating at the first and second open ends; providing a ferrule having a first end portion, a second end portion and a bore extending through the first and second end portions; providing a tubular member comprising a sleeve having a first open end, a second open end and a longitudinally extending annular recess formed in the sleeve at the second open end thereof to define first and second concentric sleeve portions, the first sleeve portion projecting outwardly from the second open end of the sleeve and having an outer diameter smaller than the inner diameter of the first end portion of the ferrule, and the second sleeve portion having an inner diameter greater than the outer diameter of the first end portion of the ferrule; disposing the ferrule within the bore of the housing so that the first end portion of the ferrule is directed toward the first open end of the housing but does not extend as far as the first open end of the housing; fitting the first open end of the tubular member into the first open end of the housing and over the first end portion of the ferrule while removably fitting the first sleeve portion of the tubular member into the first end portion of the ferrule without a gap therebetween and removably fitting the second sleeve portion of the tubular member around the first end portion of the ferrule without a gap therebetween; injecting an adhesive agent into the bore of the ferrule through the second open end of the tubular member; removing the tubular member from the first end portion of the ferrule; and inserting an optical fiber into the bore of the ferrule to thereby fix the optical fiber in the bore of the ferrule.

8. An optical fiber connector assembling method comprising the steps: providing a housing having a first open end, a second open end and a bore extending through the housing and terminating at the first and second open ends; providing a ferrule having a longitudinal axis, a first end portion, a second end portion and a bore extending along the longitudinal axis through the first and second end portions; providing a tubular member having a first open end for fitting over the first end portion of the ferrule along the longitudinal axis thereof, a second open end, and a stopper portion disposed between the first and second open ends of the tubular member for limiting the extent that the first open end of the tubular member is fitted over the first end portion of the ferrule along the longitudinal axis thereof to thereby control a quantity of an adhesive agent injected into the bore of the ferrule; disposing the ferrule within the bore of the housing so that the first end portion of the ferrule is directed toward the first open end of the housing but does not extend as far as the first open end of the housing; fitting the first open end of the tubular member into the first open end of the housing and over the first end portion of the ferrule to a predetermined extent along the longitudinal axis of the tubular member; injecting an adhesive agent into the bore of the ferrule through a second open end of the tubular member while controlling the amount of adhesive agent injected into the bore of the ferrule by means of the stopper portion of the tubular member; removing the tubular member from the first end portion of the ferrule; and inserting an optical fiber into the bore of the ferrule to thereby fix the optical fiber in the bore of the ferrule.

9. An optical fiber connector assembling method according to claim 8; wherein the fitting step includes fitting the first open end of the tubular member over the first end portion of the ferrule until the stopper portion of the tubular member contacts the first end portion of the ferrule.

10. An optical fiber connector assembling method according to claim 8; wherein the tubular member has a flange portion disposed at the second open end of the tubular member; and wherein the fitting step includes fitting the first open end of the tubular member into the first open end of the housing and over the first end portion of the ferrule while projecting the flange portion of the tubular member outwardly from the first open end of the housing.

11. An optical fiber connector assembling method according to claim 8; wherein the tubular member has a longitudinal bore extending through the first and second open ends of the tubular member, the longitudinal bore having a first bore portion opening into the first open end of the tubular member, a second bore portion opening into the second open end of the tubular member, and a tapered bore portion disposed between and connecting the first bore portion to the second bore portion to define a flow path of decreasing diameter from the second open end of the tubular member to the first open end thereof, the first bore portion having a first diameter smaller than a diameter of an injecting member for injecting the adhesive into the bore of the ferrule, and the second bore portion having a second diameter greater than the first diameter and greater than the diameter of the injecting member; and wherein the injecting step comprises injecting the adhesive into the flow path of the tubular member through the second open end thereof to control the amount of adhesive injected into the bore of the ferrule.

12. An optical fiber connector assembling method comprising the steps: providing a housing having a first open end, a second open end and a bore extending through the housing and terminating at the first and second open ends; providing a ferrule having a first end portion, a second end portion and a bore extending through the first and second end portions; providing a tubular member having first and second open ends and comprising a sleeve portion having first and second ends, a flange portion extending from the second end of the sleeve portion, and a longitudinal bore extending through the sleeve portion and the flange portion from the first open end to the second open end; disposing the ferrule within the bore of the housing so that the first end portion of the ferrule is directed toward the first open end of the housing but does not extend as far as the first open end of the housing; fitting the first open end of the tubular member into the first open end of the housing and over the first end portion of the ferrule by manipulating the flange portion; injecting an adhesive agent into the bore of the ferrule through the flange portion and the second open end of the tubular member; removing the tubular member from the first end portion of the ferrule by manipulating the flange portion; and inserting an optical fiber into the bore of the ferrule to thereby fix the optical fiber in the bore of the ferrule.

13. An optical fiber connector assembling method according to claim 12; wherein the longitudinal bore of the tubular member defines a flow path of varying diameter from the flange portion to the second end of the sleeve portion.

14. An optical fiber connector assembling method according to claim 13; wherein the flow path of the tubular member has a progressively decreasing diameter from the flange portion to the second end of the sleeve portion.

15. An optical fiber connector assembling method according to claim 12; wherein the longitudinal bore has a first bore portion opening into the first open end of the tubular member, a second bore portion opening into the second open end of the tubular member, and a tapered bore portion disposed between and connecting the first bore portion to the second bore portion to define a flow path of decreasing diameter from the second open end of the tubular member to the first open end thereof, the first bore portion having a first diameter smaller than a diameter of an injecting member for injecting the adhesive into the bore of the ferrule, and the second bore portion having a second diameter greater than the first diameter and greater than the diameter of the injecting member; and wherein the injecting step comprises injecting the adhesive into the flow path of the tubular member through the second open end thereof to control the amount of adhesive injected into the bore of the ferrule.

16. An optical fiber connector assembling method comprising the steps: providing a housing having a first open end, a second open end and a bore extending through the housing and terminating at the first and second open ends; providing a ferrule having a longitudinal axis, a first end portion, a second end portion and a bore extending along the longitudinal axis through the first and second end portions; providing a tubular member having a first open end, a second open end, a sleeve portion extending between the first and second open ends, manipulating means for manipulating the tubular member to facilitate fitting of the first open end thereof over the first end portion of the ferrule along the longitudinal axis thereof and to facilitate removal of the tubular member from the first end portion of the ferrule, limiting means for limiting the extent that the first open end is fitted over the first end portion of the ferrule along the longitudinal axis thereof, and controlling means for controlling a quantity of an adhesive agent injected into the bore of the ferrule; disposing the ferrule within the bore of the housing; using the manipulative means to fit the first open end of the tubular member into the first open end of the housing and over the first end portion of the ferrule while using the limiting means to limit the extent that the first open end is fitted over the first end portion of the ferrule along the longitudinal axis thereof; injecting an adhesive agent into the bore of the ferrule through the second open end of the tubular member while using the controlling means to control the amount of adhesive agent injected therein; removing the tubular member from the first end portion of the ferrule using the manipulating means; and inserting an optical fiber into the bore of the ferrule to thereby fix the optical fiber in the bore of the ferrule.

17. An optical fiber connector assembling method comprising the steps: disposing a ferrule within a bore of a housing; fitting a first open end of a tubular member having an annular recess defining concentric tubular portions into the bore of the housing and over an end of the ferrule while inserting the end of the ferrule between the concentric tubular portions of the tubular member; injecting an adhesive agent into a bore of the ferrule through a second open end of the tubular member; removing the tubular member from the end of the ferrule; and inserting an optical fiber into the bore of the ferrule to thereby fix the optical fiber in the bore of the ferrule.

\* \* \* \* \*